UNITED STATES PATENT OFFICE.

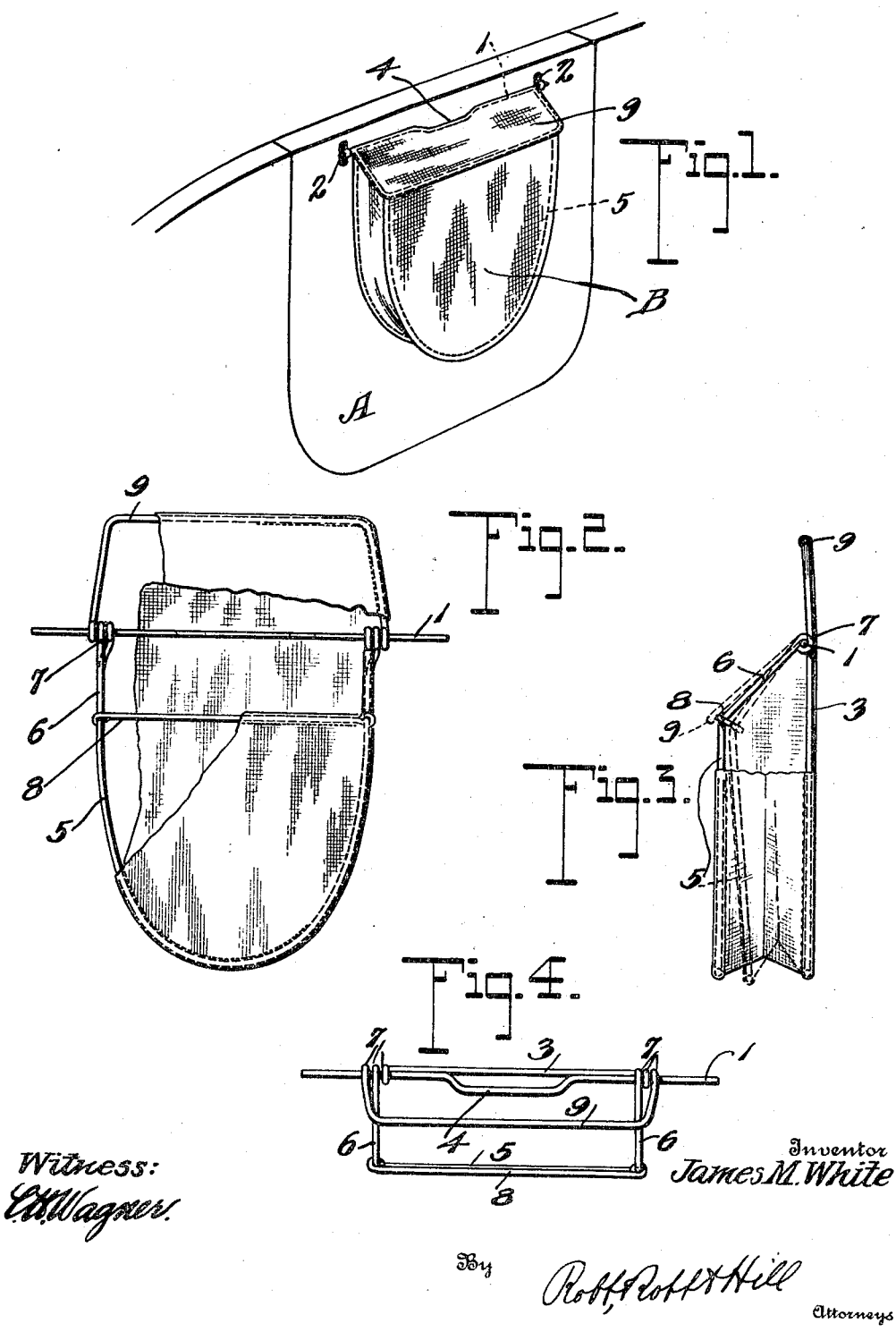

JAMES M. WHITE, OF DANVILLE, VIRGINIA.

POCKET ATTACHMENT FOR VEHICLES.

1,401,660.   Specification of Letters Patent.   Patented Dec. 27, 1921.

Application filed April 12, 1921. Serial No. 460,735.

*To all whom it may concern:*

Be it known that I, JAMES M. WHITE, a citizen of the United States, residing at Danville, in the county of Pittsylvania and State of Virginia, have invented certain new and useful Improvements in Pocket Attachments for Vehicles, of which the following is a specification.

This invention relates to a pocket attachment for automobiles and other vehicles. The doors of automobiles are usually provided with a pocket space between their inner and outer faces, the opening to which is covered by a flap. This pocket forms a convenient receptacle for various articles. Other vehicles, however, and certain makes of automobiles, such as the Ford, are not provided with door pockets, and it is the object of the present invention to provide an auxiliary pocket attachment which is inexpensive to manufacture and which may be readily attached to an automobile or other vehicle.

Another object of the invention is to provide an attachment of the character described which may be collapsed when not in use so as to project as little as possible from the surface of the vehicle to which it is attached.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings in which:

Figure 1 is a perspective view showing the application of my invention to the inner face of an automobile door.

Fig. 2 is a front elevation of the pocket attachment with a portion of the covering material removed to show the supporting frame.

Fig. 3 is a side elevation of the pocket attachment, and

Fig. 4 is a top plan view of the frame.

Corresponding and like parts are referred to in the following description and indicated in all the views of the drawings by the same reference characters.

Referring to the drawings, the reference character A designates the door of an automobile or other vehicle and B my improved pocket attachment secured thereto. The pocket comprises a metal frame and a flexible covering. The metal frame consists of a relatively fixed section, a relatively movable section, and a flap section.

The fixed section comprises a bar member 1 adapted to be attached to the supporting surface by the brackets 2 and a U-shaped member 3 having its ends connected to said bar member. The bar member 1 may be bent inwardly intermediate its ends as indicated by the reference numeral 4 so as to permit the strap attached to the window of a sedan or coupé to lie behind the pocket attachment.

The relatively movable section of the pocket frame comprises a U-shaped portion 5 having angularly related end portions 6 lying in a plane making an angle slightly greater than 90 degrees with the plane of the U-shaped portion. The movable section is hingedly connected at its ends to the bar member 1 as indicated by the reference numeral 7 and a bar member 8 extends transversely of the U-shaped portion and has its ends connected to the sides thereof at the junction of the angularly related end portion 6 with the sides of the U-shaped portion. The bar member 8 extends substantially parallel to the bar member 1.

The bar member 8, the angularly related end portions 6 and the portion of the bar member 1 between the sides of the U-shaped portion of the fixed frame section form a rectangular frame bounding the opening to the pocket, and arranged to coöperate with this rectangular frame is a flap frame in the form of the U-shaped member 9 having its ends hingedly connected to the bar member 1.

The relatively fixed and movable sections and the flap section of the frame are covered with suitable flexible material, such as leather, cloth, or the like, to form a pocket and a cover to close the opening to the pocket. It will be seen that by reason of the hinged connection of the movable section with the fixed section of the frame the U-shaped portion of the movable section may be moved to a position substantially parallel to the U-shaped portion of the fixed section of the frame. This is the normal relative position of the frame sections when the pocket is in use. However, when the pocket is empty the movable section may be moved inwardly until its lower end engages the U-shaped portion of the fixed section or lies substantially in the plane thereof.

The collapsibility of the device is very advantageous because it will permit the pocket when not in use to project a very slight distance from the surface of the vehicle to which it is attached. The frame sections can be made of wire or thin strips of metal or the like, and obviously the pocket can be made of any desired size.

It will be seen from the above description, taken in connection with the drawings, that I have provided a pocket attachment which is very simple in its construction, inexpensive to manufacture, and which may be easily attached to the interior of a vehicle or the like.

Having thus described my invention, what I claim as new and desire to secure by Letters Patent is—

1. A pocket attachment for vehicles of the type described, comprising a wire frame structure composed of a relatively stationary frame and a relatively movable frame connected thereto, the sides of the latter frame being bent intermediate their lengths in such manner as to position the movable frame in offstanding relation to the stationary frame, and covering material inclosing said frames.

2. A pocket attachment for vehicles of the type described, comprising a wire frame structure composed of a relatively stationary frame, an offstanding relatively movable frame, means connecting the two frames and constituting the support for attaching the pocket in position, and covering material for said frames.

3. A pocket attachment for vehicles of the type described, comprising a wire frame structure composed of a relatively stationary frame, a relatively movable frame connected thereto and formed to offstand from the stationary frame to thereby provide an open-mouthed receptacle, and a cover flap frame overlying the offstanding portion to form a closure for the mouth, and covering material for said frames.

4. A pocket attachment for vehicles of the type described, comprising a wire frame structure composed of a relatively stationary frame, a bar member forming a support, a relatively movable frame connected to said bar member at the point of connection of the stationary frame therewith forming a collapsible pocket side, a flap member correspondingly connected to the bar member and pivotally mounted to overlie the mouth of the pocket formed by the relatively movable frame, and covering material extending about the frame.

5. A collapsible pocket attachment for vehicles or the like, comprising a frame structure including a relatively stationary section and a relatively movable section, said stationary section comprising a bar member and a U-shaped member hingedly connected at its ends to said bar member, and said movable section comprising a U-shaped member hingedly connected to said bar member of said stationary section.

6. A collapsible pocket attachment for vehicles or the like, comprising a frame structure including a relatively stationary section and a relatively movable section, said stationary section comprising a bar member and a U-shaped member hingedly connected at its ends to said bar member, the ends of said bar member projecting beyond the sides of said U-shaped member, and said movable section comprising a U-shaped member having angularly related end portions hingedly connected to said bar member of said stationary section and a bar member extending transversely of and having its ends attached to the sides of said last-mentioned U-shaped member at the junction therewith of said angularly related end portions.

7. A pocket attachment for vehicles or the like, comprising a pocket frame and a flap frame, said pocket frame comprising a pair of similar U-shaped portions adapted to be spaced apart in substantially parallel planes and a rectangular portion bounding the opening to said pocket, and said flap frame comprising a U-shaped member hingedly connected to said pocket frame, and covering material for said pocket and flap frames.

In testimony whereof I affix my signature.

JAMES M. WHITE.